(12) United States Patent
Chen

(10) Patent No.: US 6,494,198 B1
(45) Date of Patent: Dec. 17, 2002

(54) STONE CUTTER

(76) Inventor: Yuehting Chen, P.O. Box 697, Feng-Yuan City 420 (TW)

( * ) Notice: Subject to any disclaimer, the term of this patent is extended or adjusted under 35 U.S.C. 154(b) by 79 days.

(21) Appl. No.: 09/843,433

(22) Filed: Apr. 24, 2001

(51) Int. Cl.[7] .................................................. B28D 1/04
(52) U.S. Cl. ....................... 125/13.01; 125/35; 451/360
(58) Field of Search ................................ 125/13.01, 35; 451/488, 461, 450, 454, 455, 340

(56) References Cited

U.S. PATENT DOCUMENTS

| | | | | |
|---|---|---|---|---|
| 1,824,000 A | * | 9/1931 | Walter | 125/13.01 |
| 2,431,469 A | * | 11/1947 | Eyles | 125/13.01 |
| 2,444,598 A | * | 7/1948 | Eyles et al. | 125/13.01 |
| 2,743,717 A | * | 5/1956 | Wilkin | 125/13.01 |
| 2,863,441 A | * | 12/1958 | Harclerode | 125/13.01 |
| 3,008,462 A | * | 11/1961 | Williams | 125/13.01 |
| 4,940,038 A | * | 7/1990 | O'Keefe | 125/13.01 |
| 5,127,391 A | * | 7/1992 | O'Keefe | 125/13.01 |
| 5,676,124 A | * | 10/1997 | Lee | 125/13.01 |
| 5,832,913 A | * | 11/1998 | Arends | 125/13.01 |
| 6,253,757 B1 | * | 7/2001 | Benson | 125/11.22 |
| 6,263,866 B1 | * | 7/2001 | Tsao | 125/13.01 |
| 6,283,110 B1 | * | 9/2001 | Lee | 125/13.01 |
| 6,347,624 B1 | * | 2/2002 | Smith et al. | 125/13.01 |

* cited by examiner

*Primary Examiner*—Joseph J. Hail, III
*Assistant Examiner*—David B. Thomas

(57) ABSTRACT

A stone cutter includes a working station separated at center by a partition to form a water sink and a motor compartment. The motor has a shaft inserted through the partition entered into the water sink and connected to a disk saw. A water trough in four sides of the working station. A pair of rulers having the serrations on outer edge on opposite side and a rail formed on the other side of the working station. A bar pivoted with a dividing circle slidably inserted into the rail for cutting the angled working pieces. A slidable guide slides between the rulers for cutting the rectangular working pieces. And a second working plate can be sloped on the motor compartment for cutting the oblique edge of the working pieces in different angle less than 90 degrees.

4 Claims, 8 Drawing Sheets

STONE CUTTER

BACKGROUND OF THE INVENTION

The present invention relates to cutting machines and more particularly to a stone cutter which can cut different angles for the stone marble and/or tiles and which prevents the water to permeate into the motor.

In house construction, the stone cutter is useful to cut the marble or tiles before paving them to the wall or ground. Conventional stone cutter makes the dust and heat in the saw disk which is inconvenient. So that a stone cutter has to have a water section and a power section which comprises a motor to drive the saw disk at a center of the cutter and a water sink under the saw disk to prevent it from creating the dust and/or over heat. The motor though is sealed by a cover can not prevent the permeating of the water, therefore the motor is damageable.

Another conventional stone cutter has no measurement equipped thereon. The cutting result is very rough. Besides, it has no where to contain the electrical mires, it is very difficult to carry from one place to another.

SUMMARY OF THE PRESENT INVENTION

The present invention has a main object to provide a stone cutter which can cut the stone, marble and/or tiles into regular pieces or different angles.

Another object of the present invention is to provide a stone cutter which can make the edge of the working piece oblique in different angle less than 90 degrees.

Still another object of the present invention is to provide a stone cutter which has rulers on opposite sides incorporation with a slidable guide in order to make the cutting more neat.

Further object of the present invention is to provide a stone cutter which has a dividing plate to help the working piece to be cut into precise angle.

Further object of the present invention is to provide a stone cutter in which the shaft of the motor is sealed by scalings and the swing disk so that the water will not permeate into the motor.

Further object of the present invention is to provide a wire container to receive the electrical wire therein in order to make the electrical wire not disordered.

The present invention will become more fully understood by reference to the following detailed description thereof when read in conjunction with the attached drawings.

DETAILED DESCRIPTION OF THE PREFERRED EMBODIMENT

Figure 1:
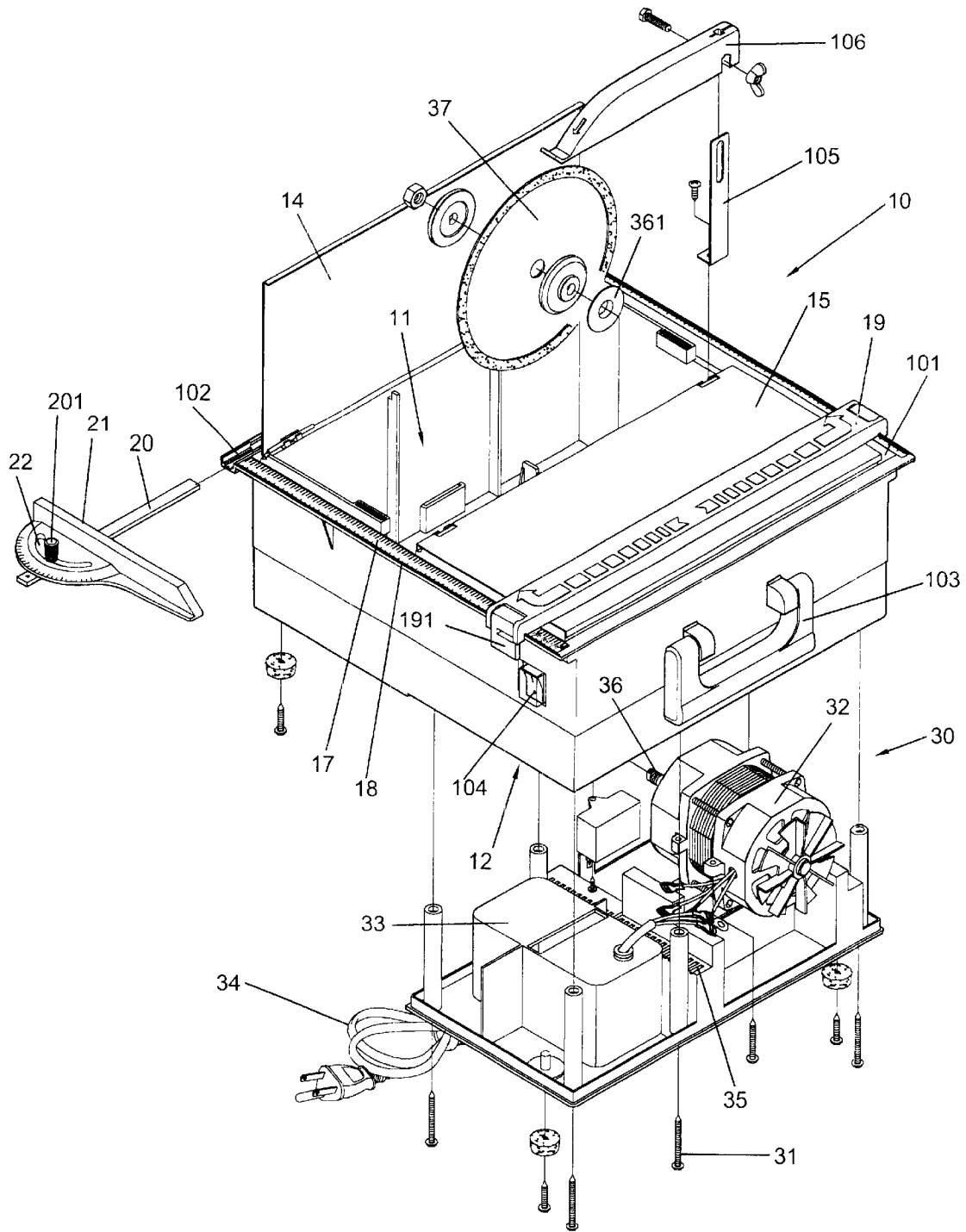
FIG. 1 is an exploded perspective view to show the stone cutter of the preferred embodiment according to the present invention.
Figure 2:
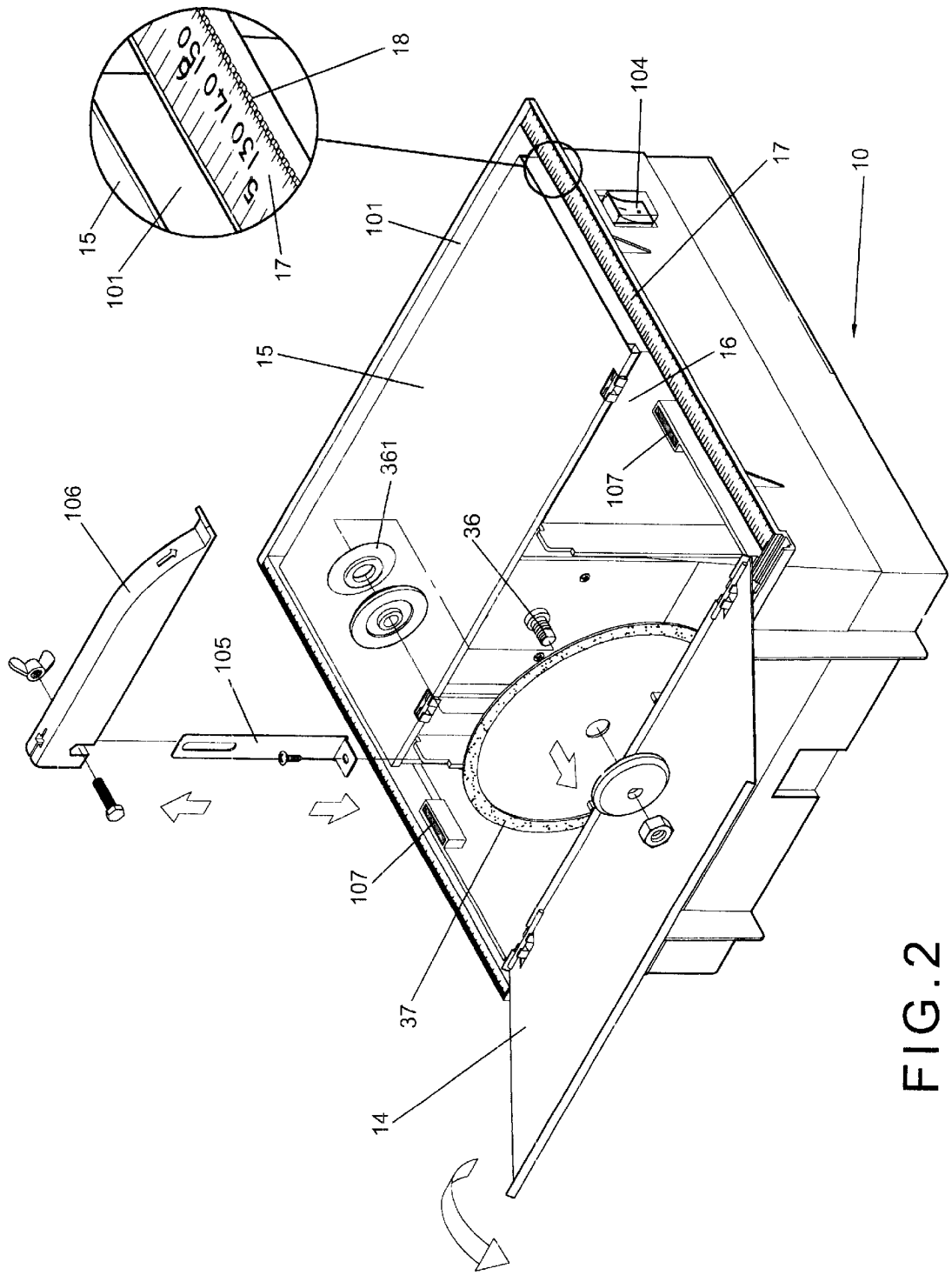
FIG. 2 is an exploded perspective view to show a disk saw relative to the working station.
Figure 3:
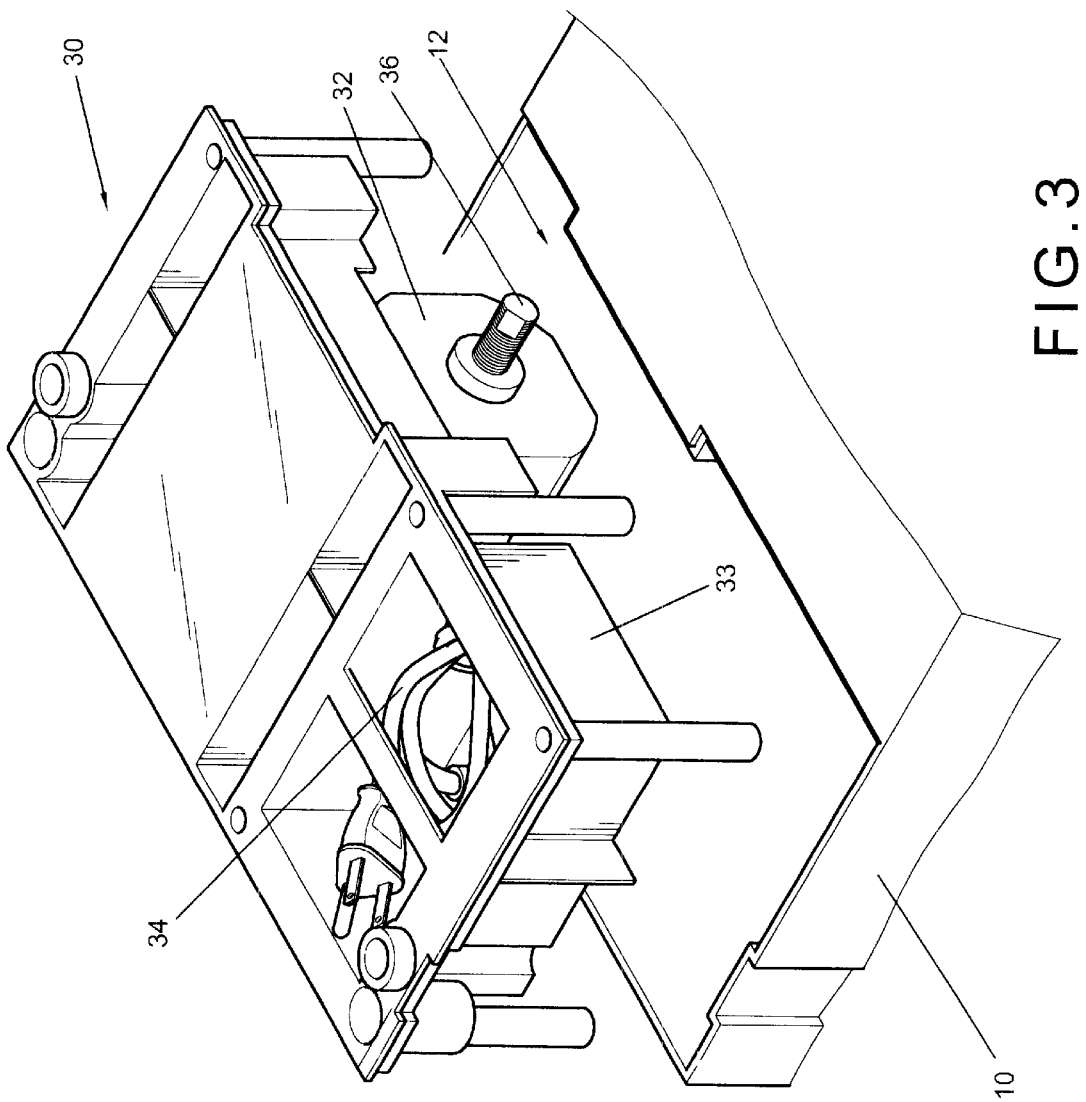
FIG. 3 is a perspective view to show partially the working station and the lower cover.
Figure 8:
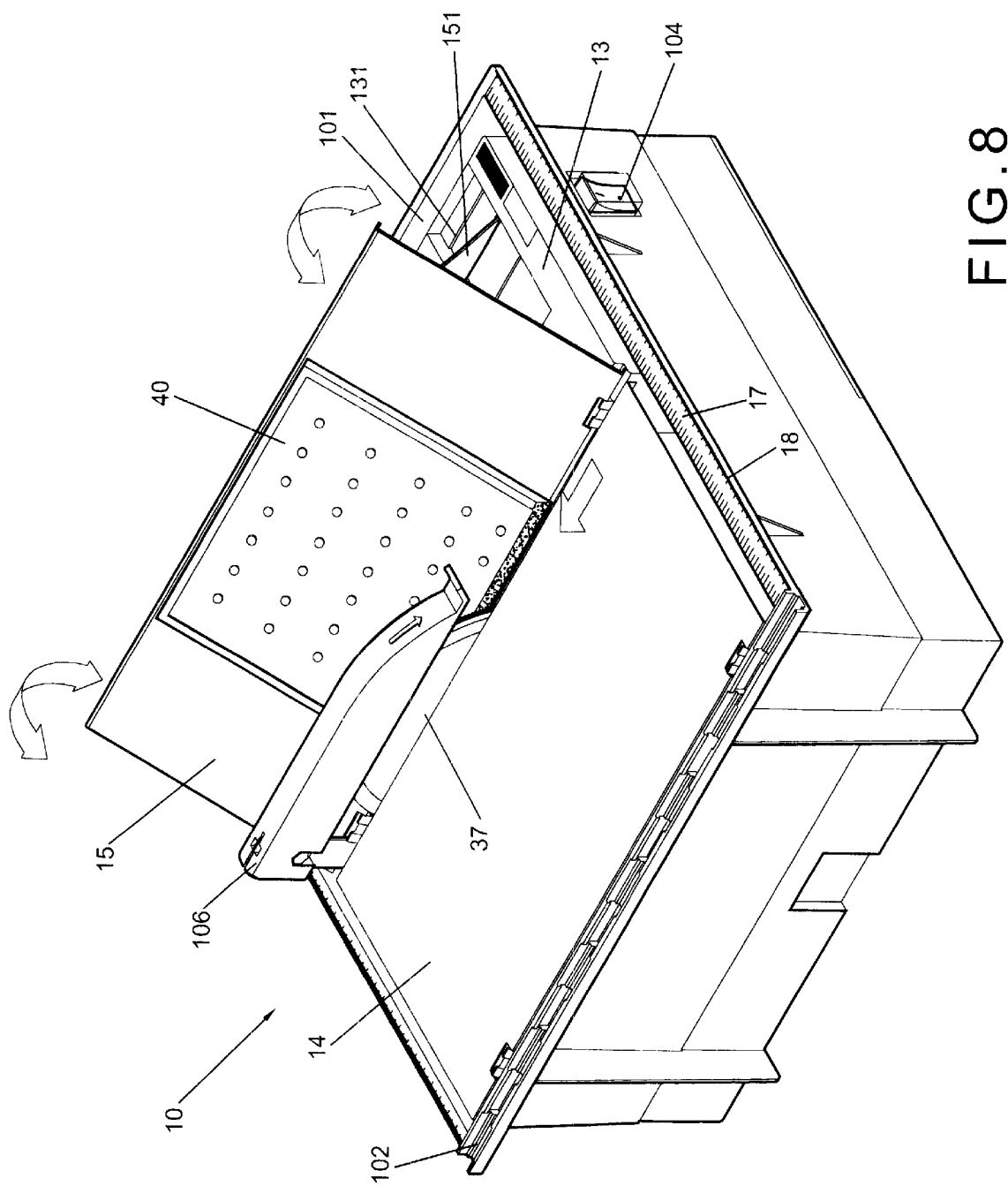
FIG. 8 is a perspective view to show a tile being cutting into oblique edge in certain angle.

With reference to FIGS. 1, 2 and 3 of the drawings, the stone cutter of the present invention comprises a rectangular housing 10 which is making a working station separated into two equal sections by a partition 16 at center of the housing 10. The first section 11 is making a water sink to contain cold water. The second section 12 is making a motor compartment which has been sealed by an upper cover 13 and a lower opening (as shown in FIG. 8). The cover 13 has a angular strap 131 and a working plate adjustable rack 151 at a corner. The water sink 11 has a first working plate 14 hinged on a side of the housing 10 to cover the water sink 11, on the top of the cover 13, there is a second working plate 15 which is hinged on the top of the partition 16 to cover the upper cover of the motor compartment. The adjustable rack 151 under the second working plate 15 can stop against the angular strap 131. The working station 10 has rulers 17 on opposite side with serrations 18 abutting the outer edge of the rulers 17 along the length thereof for slidably engaging with a sliding guide 19 which has fasteners 191 at two ends releasibly engaging with the serrations 18, a water trough 101 formed in four side of the station 10 for leading the water back to the water sink 11, a rail 102 on a side of the station 10, a movable handle 103 on one side of the stations opposite to the rail 102, a switch 104 on other side of the station 10 under one of the rulers 17, a support 105 secured in the water sink 11 by screw abutting the partition 16, a saw guide 106 movably fastened to the top of the support 105 and a pair of magnets 107 on opposite sides of the sink 11 abutting the rulers 17 respectively.

A bar 20 slidably inserts into the rail 102 having an outer end pivoted to a dividing circle 21 which has an crescent slot 22 and an adjustable button 201 in the slot 22 for adjusting the angle of the dividing circle 21.

A lower cover 30 engages with the bottom of the second section 12 secured by screws 31. The lower cover 30 has carried a motor 32, a wire container 33 containing the electrical wires 34 and vent 35. The motor 32 has a shaft 36 inserted through a thru hole in the partition 16 and entered into the water sink 11. The shaft 36 has been sealed by sealings and the swing disks 361 then connected to a disk saw 37. Upon this arrangement, the water in the sink 11 will not permeate into the motor 32.

Figure 4:
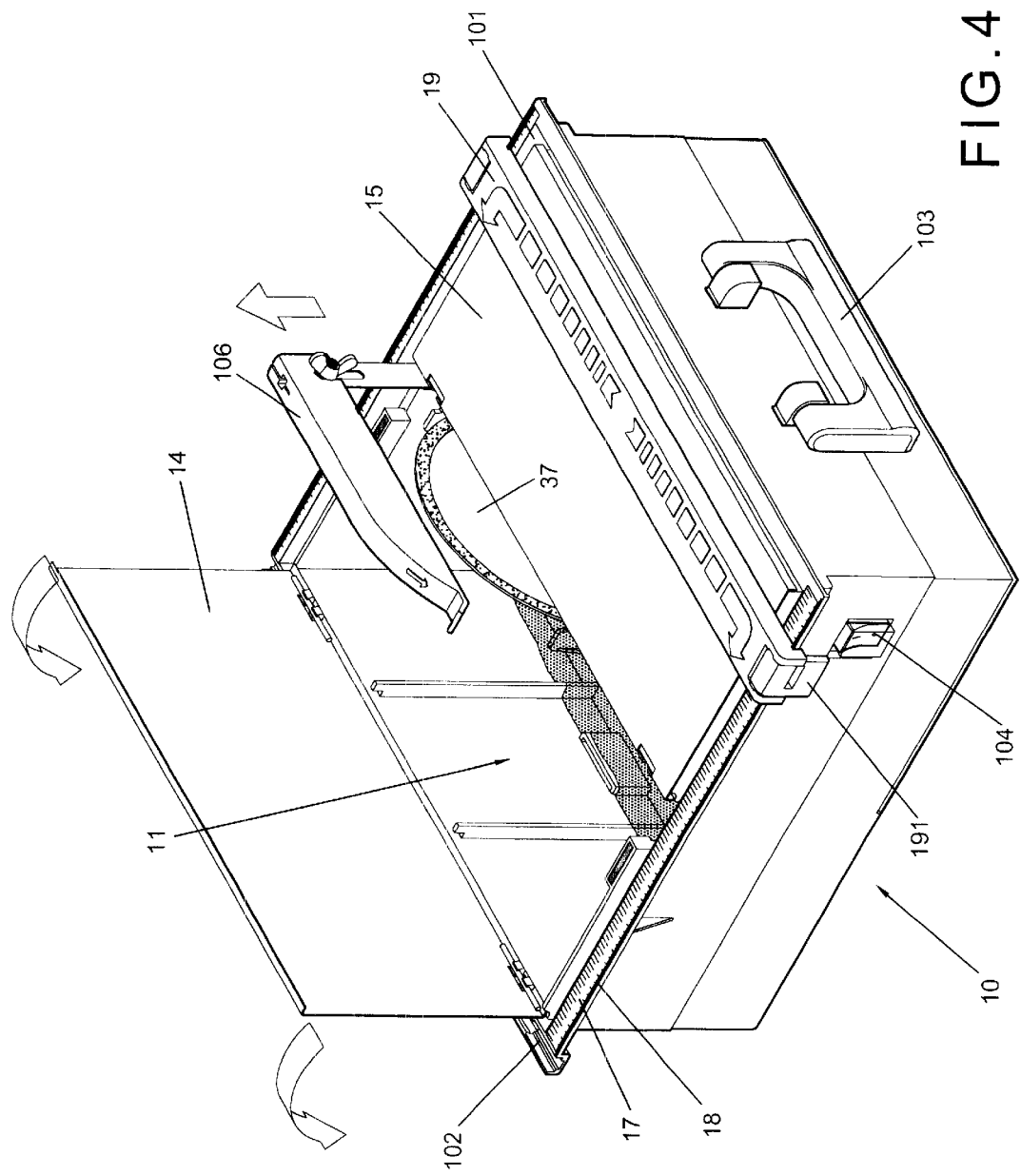
FIG. 4 is a perspective view to show the opening of an adjustable working plate.
Figure 5:
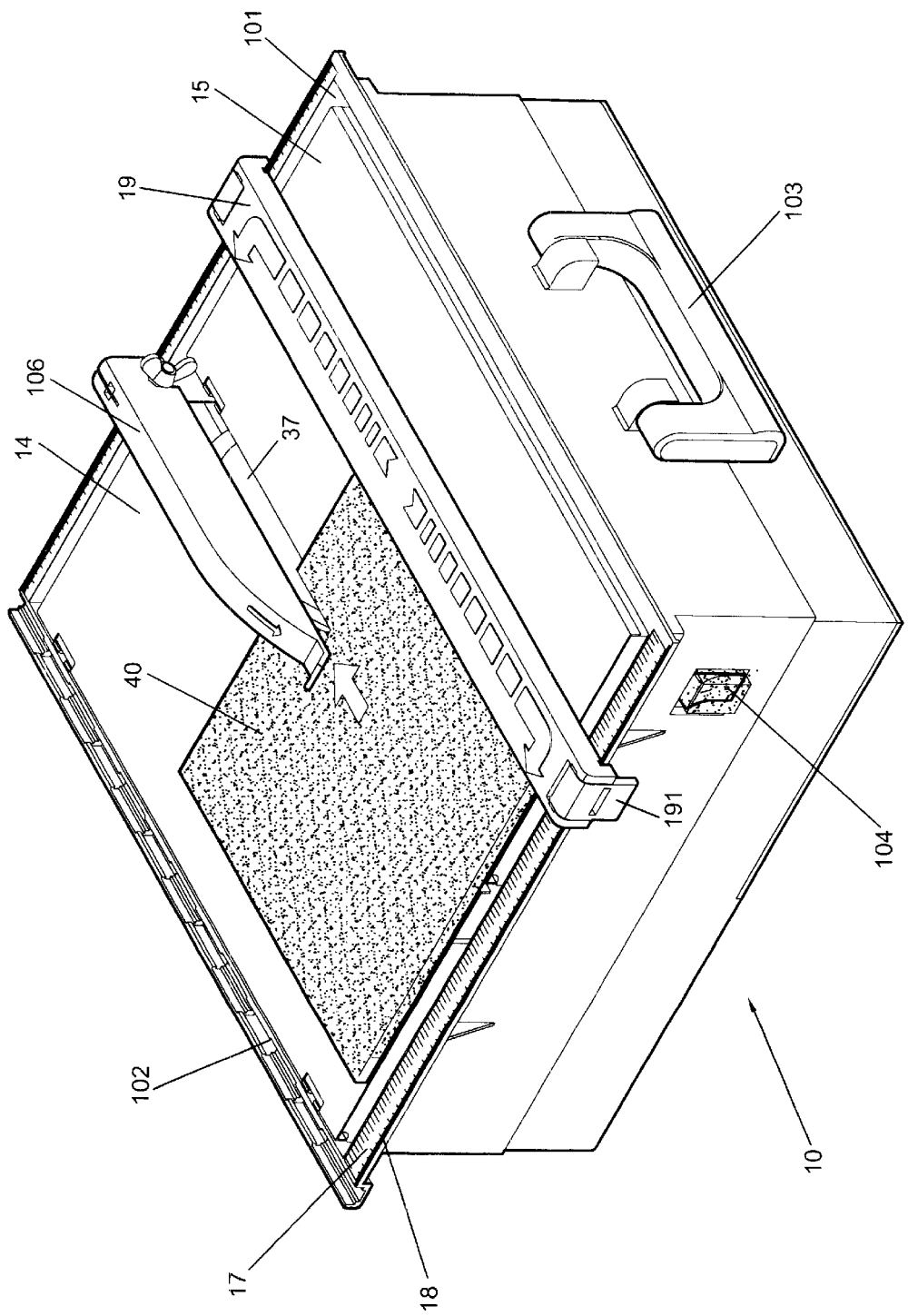
FIG. 5 is a perspective view to show a marble being cutting by the disk saw.

Referring to FIGS. 4 and 5, the disk saw 37 is partially protruded on the top of the working station 10 and protected by the saw guide 106. When the water is poured into the water sink 11, the first working plate 14 covers the sink 11 and secures by the pair of magnets 107. Then move the slidable guide 19 to decide the exact position on the ruler 17 and fix the fastener 191 and then turn on the switch to cut a stone piece or marble 40.

Figure 6:
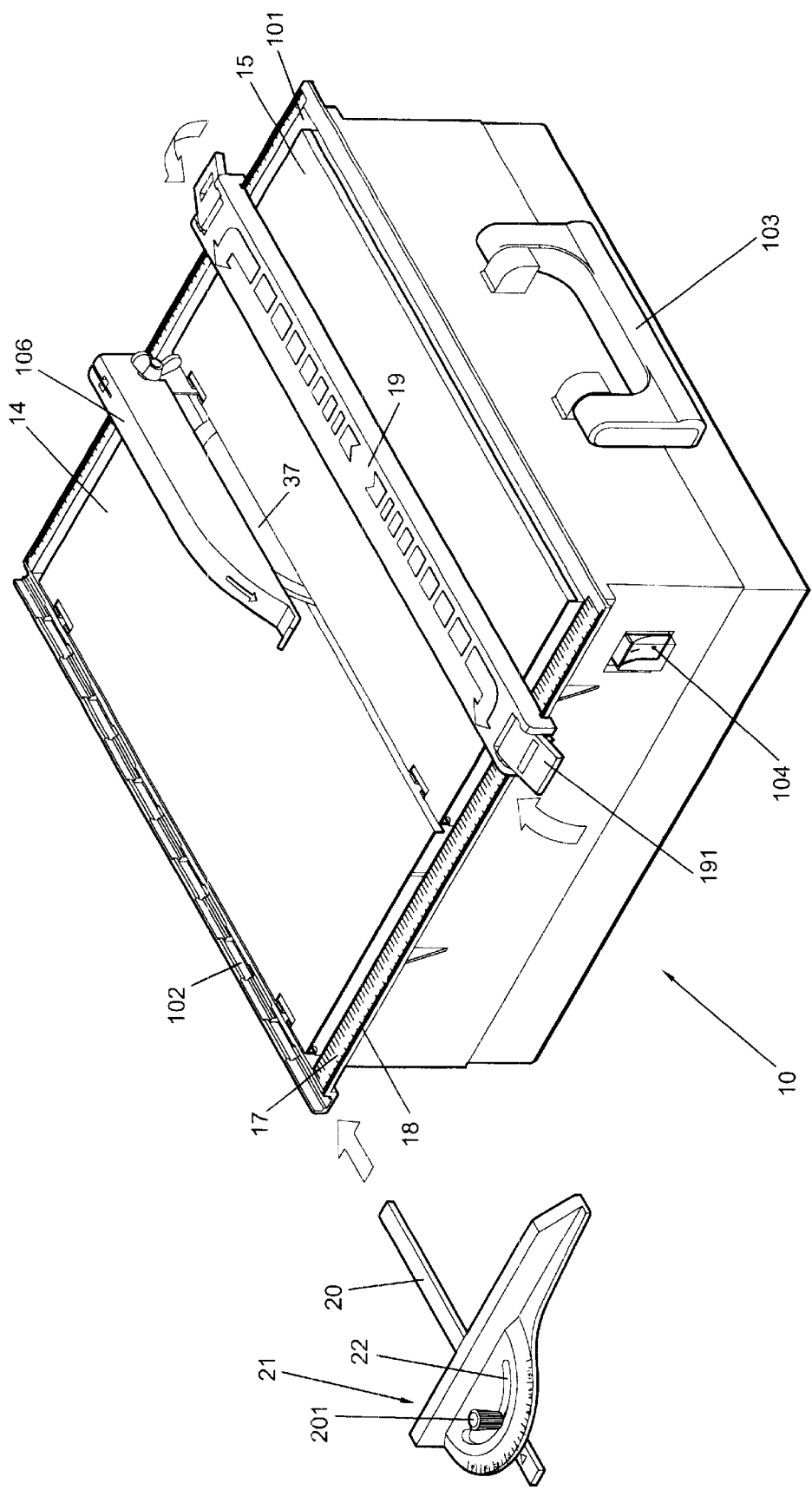
FIG. 6 is a perspective view to show the dividing plate being slidably inserted into the groove of the working station.
Figure 7:
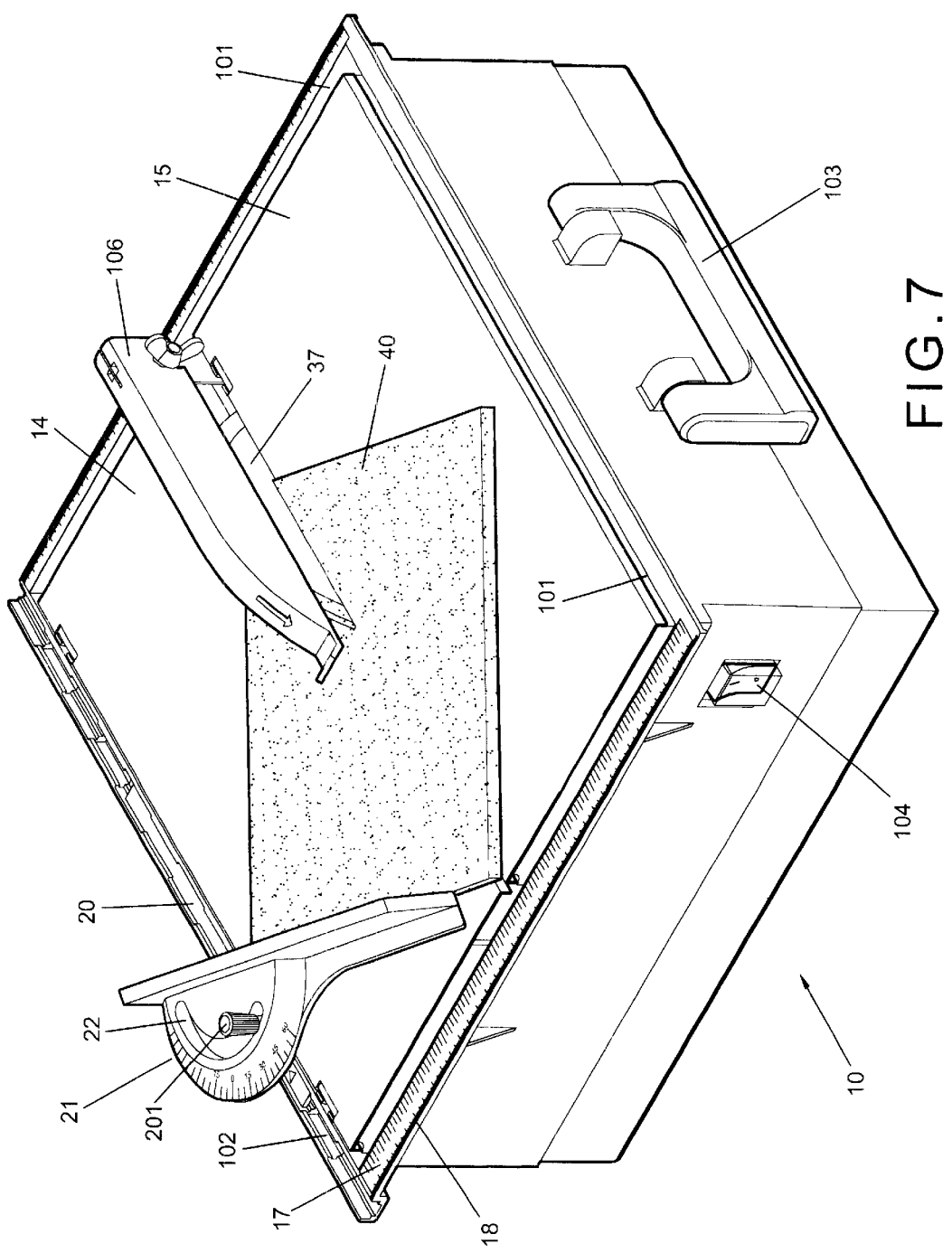
FIG. 7 is a perspective view to show a marble being pushed by the dividing plate to cut into angular pieces.

Referring to FIGS. 6 and 7, remove the slidable guide 19 and insert the bar 20 into the rail 102. Then swing the adjustable button to decide an exact angle and then put a stone piece or marble 40 abutting the dividing circle 21 and push the bar 20 forward, the working piece will be cut into a desired angle.

Referring to FIG. 8, open the second working plate 15 which will be supported by the adjustable rack 151 to make a slope of certain degrees of angle, put a working piece 40 thereon, then push the working piece 40 toward the disk saw, an oblique edge of the working piece 40 will cut in certain degrees of angle. Actually, the second working plate 15 will be sloped in different angles less then 90 degrees. So that the edge of the working piece 40 will be cut into different oblique angles.

The stone cutter of the present invention has at least the following advantages:

a) the motor is completely separated with the water sink, the water will never be permeated into the motor, b) the motor is easy to dissipate heat and easy to assemble or disassemble, c) a wire container contains the electrical wires which will not be disordered, d) a dividing circle facilitates the working piece to be exactly cut into different angles, e) can cut oblique edge for the working piece in any angle less than 90 degrees.

The specification relating to the above embodiment should be construed as exemplary rather than as limitative of the present invention, with many variations and modifications being readily attainable by a person of average skill in the art without departing from the spirit or scope thereof as defined by the appended claims and their legal equivalents.

I claim:

1. A stone cutter comprising:

a rectangular working station separated at a center by a partition to form a water sink and a motor compartment which has an upper cover and a lower opening, an angular strap abutting an adjustable rack at a corner of the upper cover, a first working plate hinged on side of the working station to cover the water sink, a second working plate hinged on top of the partition to cover the upper cover of the motor compartment, a pair of rulers each abutting a serration along the length of outer edge disposed along opposite sides of the working station, a sliding guide slidably disposed between the rulers having a pair of fasteners at two ends engageable with the serrations, a water trough around four edges of the working station for leading the water back into the sink, a rail formed on one side thereof, a movable handle on a side of the working station opposite to the rail, a switch on other side of the working station under one of the rulers, a support means secured into the water sink by screw abutting the partition, a saw guide movably fastened on top of the support means and a pair of magnets on opposite sides of the water sink abutting the rulers respectively;

a lower cover engaged with the lower opening of the motor compartment by screws, said lower cover carrying a motor, a vent and a wire container for containing electrical wires therein, said motor having a shaft inserted through a thru hole in the partition entering into the water sink and connected to a disk saw and sealed by sealings and swing disks;

a bar slidably insertible into the rail having an outer end pivoted to a dividing circle which having crescent slot and an adjustable button in the slot for adjusting the angles of the dividing circle.

2. The stone cutter as recited in claim 1 wherein said sliding guide is used to cut rectangular working pieces.

3. The stone cutter as recited in claim 1 wherein said dividing circle is used to cut angled working pieces.

4. The stone cutter as recited in claim 1 wherein said second working plate may be sloped to cut an oblique edge for the working piece in different angles less than 90 degrees.

* * * * *